(12) United States Patent
Park et al.

(10) Patent No.: US 8,450,675 B2
(45) Date of Patent: May 28, 2013

(54) IMAGE PROJECTOR HAVING A PHOTO SENSOR PROVIDING MEASUREMENT VALUES NECESSARY FOR A COLOR CALIBRATION

(75) Inventors: Mun-Kue Park, Gyeonggi-do (KR); Yong-Chan Keh, Seoul (KR); Jin-Wook Kwon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 319 days.

(21) Appl. No.: 12/985,701

(22) Filed: Jan. 6, 2011

(65) Prior Publication Data

US 2011/0188002 A1 Aug. 4, 2011

(30) Foreign Application Priority Data

Feb. 1, 2010 (KR) .................. 10-2010-0009303

(51) Int. Cl.
*H01L 27/00* (2006.01)
(52) U.S. Cl.
USPC .......................................... 250/208.1; 353/31
(58) Field of Classification Search
USPC ................ 250/208.1, 226, 205, 216; 353/31, 353/33, 98, 122; 345/22, 419
See application file for complete search history.

(56) References Cited

U.S. PATENT DOCUMENTS

| | | | |
|---|---|---|---|
| 7,888,623 B2 * | 2/2011 | Kawashima et al. | ......... 250/205 |
| 2007/0216876 A1 | 9/2007 | Narikawa | |
| 2008/0259289 A1 | 10/2008 | Nozaki et al. | |
| 2010/0128052 A1 | 5/2010 | Keh et al. | |

FOREIGN PATENT DOCUMENTS

| | | |
|---|---|---|
| JP | 2000194275 | 7/2000 |
| JP | 2006093822 | 4/2006 |
| JP | 2007-079402 | 3/2007 |
| JP | 2007-248997 | 9/2007 |
| KR | 1020100058842 | 6/2010 |

\* cited by examiner

*Primary Examiner* — Que T Le
(74) *Attorney, Agent, or Firm* — The Farrell Law Firm, P.C.

(57) ABSTRACT

An image projector for calibrating a color of an image and recalibrating the color of the image is provided. The image projector includes an illuminating optical part having at least three independent light sources; a light modulator for modulating light emitted from the illuminating optical part according to an image signal; an imaging optical part for projecting the light modulated by the light modulator onto the screen to form an image; and a photo sensor disposed in a light path traveling in a different direction than a direction of the light beam to be projected on the screen, receiving a portion of the light beam modulated by the light modulator and providing measurement values necessary for a color calibration.

9 Claims, 6 Drawing Sheets

IMAGE PROJECTOR HAVING A PHOTO SENSOR PROVIDING MEASUREMENT VALUES NECESSARY FOR A COLOR CALIBRATION

PRIORITY

This application claims priority under 35 U.S.C. §119(a) to an application filed in the Korean Industrial Property Office on Feb. 1, 2010 and assigned Serial No. 10-2010-0009303, the entire contents of which is incorporated herein by reference.

BACKGROUND OF THE INVENTION

1. Field of the Invention

The present invention relates generally to an image projector, and more particularly to an optical system of the image projector capable of providing color calibration, such that the image projector is built-in or carried by a portable terminal.

2. Description of the Related Art

Lamps irradiating white light are generally used as a light source in the conventional image projector. Recently, an independent light sources having at least three colors to emit respective lights have been used more often as light sources for image projectors. Independent light sources can increase a light transmitting efficiency, and also facilitate miniaturization of products using the independent light source, due to developments in manufacturing technologies for these independent light sources.

An image projector may be composed of light sources for generating light having different visible wavelengths, such as a laser diode or a Light Emitting Diode (LED), and a spatial light modulator for irradiating the generated light on respective pixels on a screen, depending upon needs related to use of the image projector. When an image projector uses an independent light source, the color temperature of an image is determined by a spatial light modulator, which modulates the intensity or the phase of the light according to original image signals, duty ratios of the operational frequencies of the independent light sources, and light intensities of the respective colors, where the light intensities include optical efficiencies of the respective light sources. The self-intensity distributions of the respective light sources also affect the color temperature of the image projector.

In a projector having an LED light source, exemplary distributions of the color temperature due to such various factors may be as shown in FIGS. 1 and 2. Here, FIGS. 1 and 2 illustrate the color temperature distributions of the first and second group projectors, respectively. A red LED typically has a brightness range of 19.0~24.5 lm and a wavelength range of 615~620 nm, a green LED has a brightness range of 54.0~70.0 lm and a wavelength range of 525~535 nm, and a blue LED has a brightness range of 11.0~14.5 lm and a wavelength range of 455~465 nm.

Referring to FIGS. 1 and 2, a portion of the International Commission on Illumination (CIE) 1931 color space and a Planckian locus are illustrated, wherein the transverse axis denotes an x-chromaticity value and the vertical axis illustrates a y-chromaticity value. These values can be distorted as the color temperature varies according to the original image signal as well as the intensity of the original light source and the optical efficiency. The x-chromaticity and y-chromaticity values can also vary according to unit settings of the respective projectors.

In FIGS. 1 and 2, "CCT" refers to a Correlated Color Temperature, $CCT_{mix}$ denotes a target CCT, D65 means 65000K, and D93 means 93000K. In FIG. 1, the CCT distribution exists in a range of 6,457~18,682K, while in FIG. 2, the CCT distribution is in a range of 6,669~9,504K.

As shown in FIG. 3, an optical system 10 employed in a conventional image projector may include an illuminating optical part 11, a light modulator 13, and an imaging optical part 12. The illuminating optical part 11 includes at least three light sources 110, 111 and 112 having different wavelengths, at least one filter 113, a lens part 114 and a mirror 115. The light modulator includes a Digital Micromirror Display (DMD) panel 13. The imaging optical part 12 includes a prism 120 and a projection lens 121.

The light sources 110, 111 and 112 include Red-Green-Blue (RGB) LEDs, each generating red light, green light and blue light. Hence, the optical system 10 mixes the red, green, and blue lights to create light having a desired color.

The filter 113 is a dichroic filter used for a color separation and/or synthesis of the light sources 110, 111 and 112, and transmits only a selected wavelength from a visible spectrum, while reflecting the remaining wavelengths.

Meanwhile, the lens 114 includes a fly-eye lens or another similar lens, which enables the brightness of each colored light beam to be uniformly projected onto a screen (not shown), such that the light passing the lens 114 enters the mirror 115. Most of the light beam reflected by the mirror 115 is directed toward the prism 120, while a portion of the light is received at a color sensor (not shown) and given a calibrated value by the color sensor. The above-described conventional projector utilizes a light beam in calibration by taping the light beam at the mirror 115 of the illuminating optical part 11 before the light beam reaches the DMD panel 13 described below.

The prism 120 is a Total Internal Reflection (TIB) prism used in converting a direction of the light beam with a reflecting surface. The prism 120 has a light path that reflects the incident light beam from the mirror 115 toward the DMD panel 13, and transmits the light beam received at the DMD panel 13 toward the projection lens 121 of the imaging optical part 12.

However, in the above-described optical system, since the optical system uses the light beam in the color calibration with the color sensor by taping the light beam before the light beam reaches the spatial light modulator like the DMD panel, the optical system cannot ensure that the color temperature and the color coordinate of the image to be formed on the screen by the spatial light modulator have constant correlations with the color temperature and the color coordinate of the light beam that is taped with respect to the respective projector modules and the image formed on the screen. Constant correlations cannot be maintained, because the respective light sources have wavelength distributions in several nm, and the light paths of the respective projector do not coincide exactly.

If the taping rate is increased in order to address the problem of the varying correlations, the amount of the light that reaches the screen is reduced.

SUMMARY OF THE INVENTION

Accordingly, the present invention has been made to solve the above-described problems. An aspect of the present invention provides an image projector capable of being directly carried or built in the portable terminal with a small size, light weight, or lower power consumption, which is easy to provide a color calibration by itself using a photo sensor disposed in the inner light path without any external device and possible to recalibrate the same.

In accordance with an aspect of the present invention, an image projector is provided. The image projector includes an illuminating optical part having at least three independent light sources; a light modulator for modulating light emitted from the illuminating optical part according to an image signal; an imaging optical part for projecting the light modulated by the light modulator onto the screen to form an image; and a photo sensor disposed in a light path traveling in a different direction than a direction of the light beam to be projected on the screen, receiving a portion of the light beam modulated by the light modulator and providing measurement values necessary for a color calibration.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Figure 1:
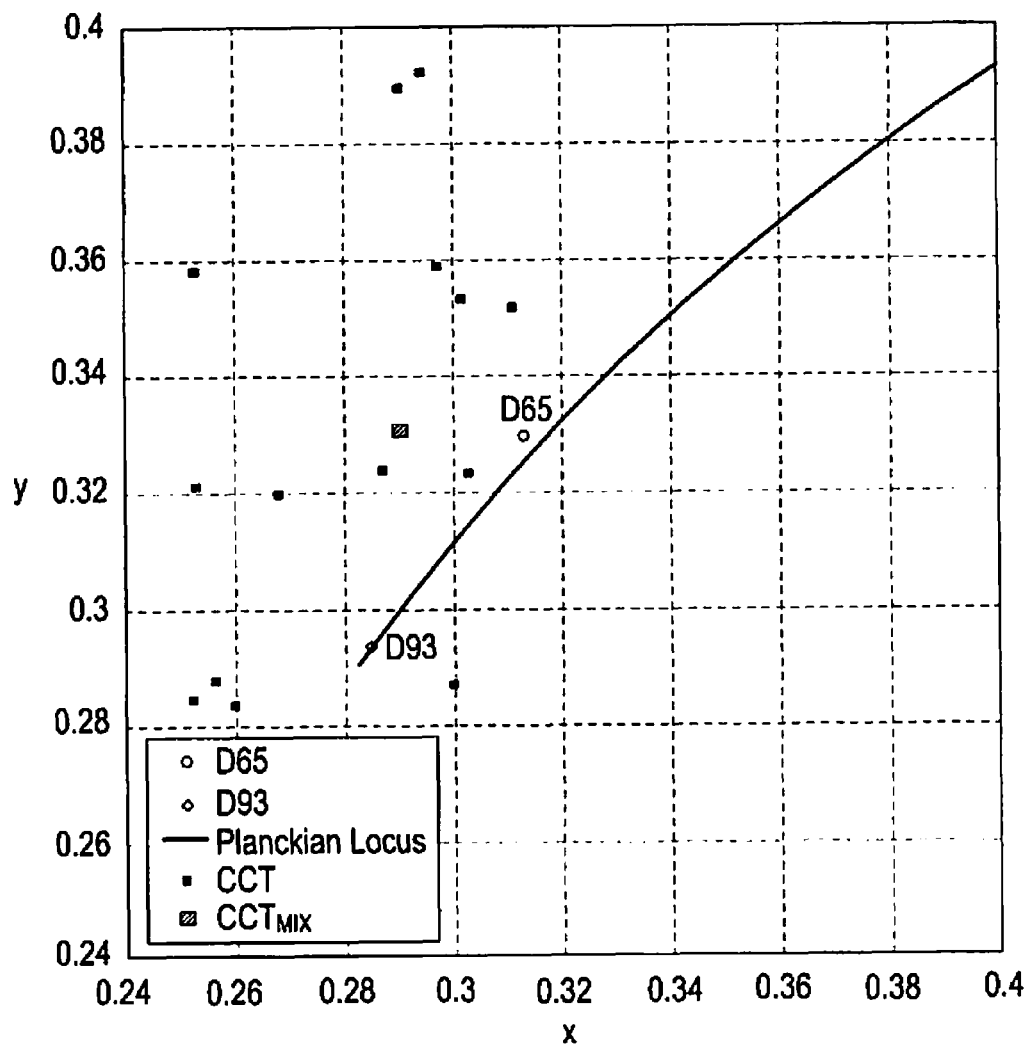
FIGS. 1 and 2 are graphs illustrating distributions of color temperatures of first and second group projectors, respectively.
Figure 2:
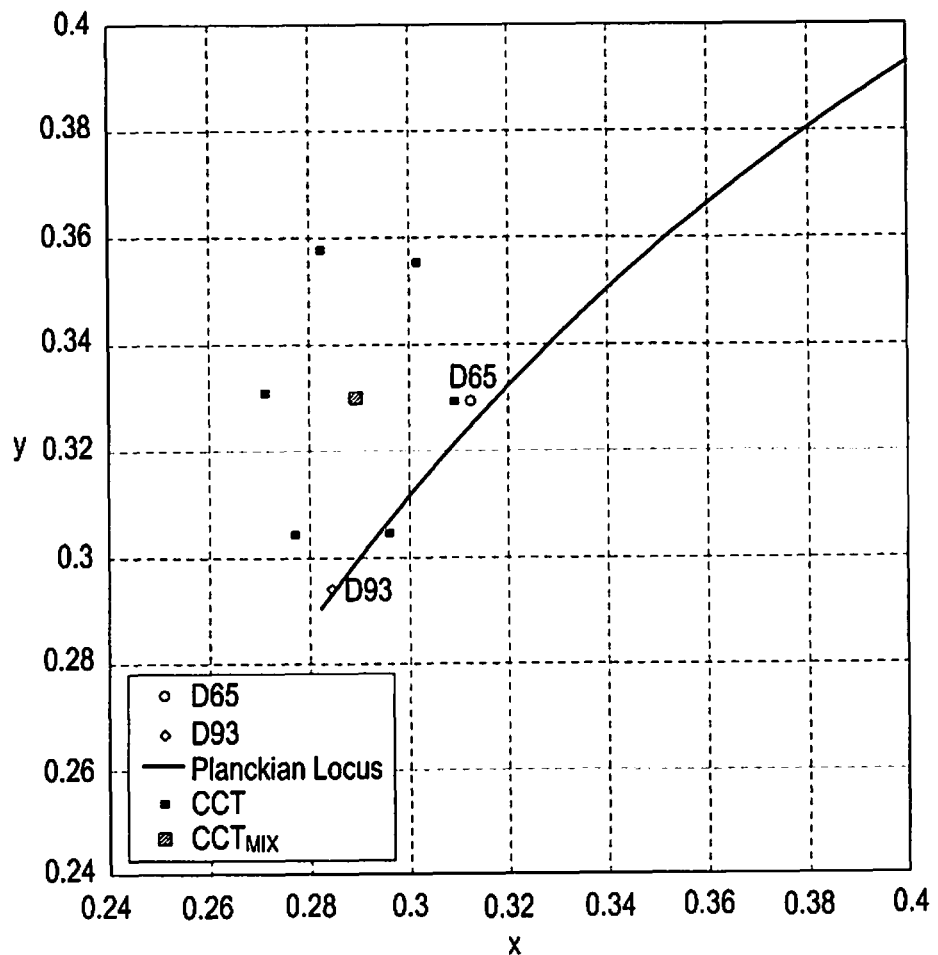
Figure 3:
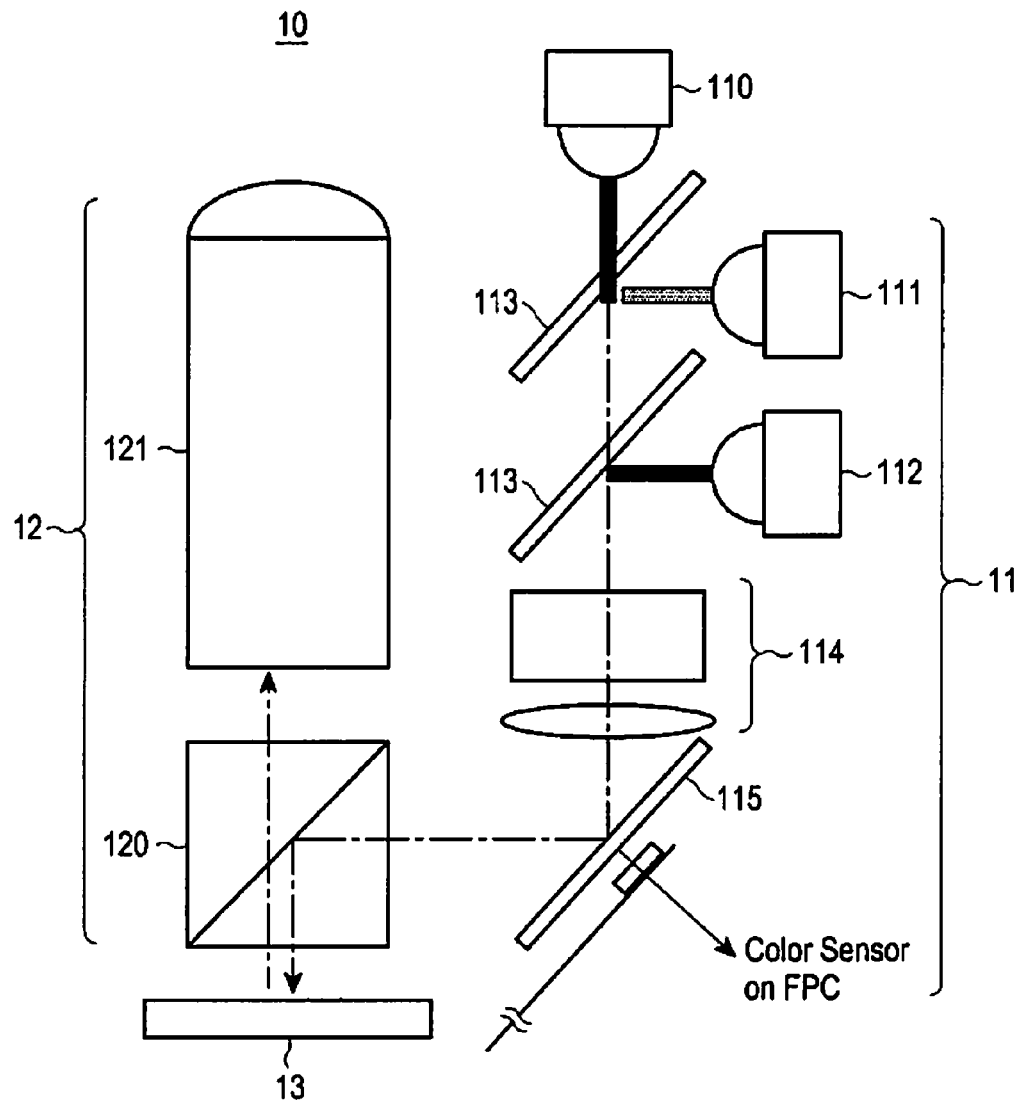
FIG. 3 is a schematic diagram illustrating an optical system of a conventional image projector.

Hereinafter, embodiments of the present invention are described with reference to the accompanying drawings. In the following description, the same or similar elements may be designated by the same reference numerals although they are shown in different drawings.

Figure 4:
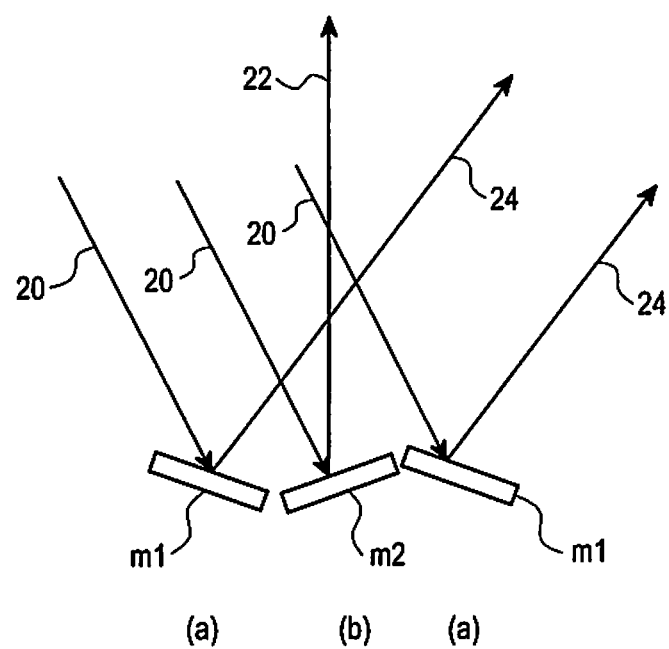
FIG. 4 is a schematic diagram illustrating an operational principle using a light modulator in an optical system of an image projector according to an embodiment of the present invention.

FIG. 4 is a schematic diagram illustrating an operational principle using a light modulator in an optical system of an image projector according to an embodiment of the present invention.

Referring to FIG. 4, modulation states of the pixels of a plurality of the light modulators m1 and m2 are shown. In the present example, the number of pixels and their arrangement vary according to the characteristics of the respective light modulators m1 and m2, and the resolution thereof. Further, the modulation state of each pixel is modulated into one of (a) and (b) states according to the image signal applied to the pixel.

Reference numeral 20 indicates a direction in which the light beam emitted from the illuminating optical part is introduced into the light modulators m1 and m2. A spatial angle of the light beam may vary according to an optical design. Reference numeral 22 indicates a direction of a light beam that is projected on the screen through the imaging optical part according to the given image signal, from among the light beams introduced into the light modulator m2. Reference numeral 20 indicates a direction of a light beam that must not transmit the imaging optical part according to the given image signal, among the light beams entered the light modulator m1.

According to an embodiment of the present invention, the color temperature and the color coordinate of the image projected on the screen is calibrated by placing a color calibration photo sensor on the path of a light beam that as not traveled through the imaging optical part. The calibration photo sensor may include at least one of a color sensor, a Charge Coupled Device (CCD) sensor, a Complementary Metal Oxide Semiconductor (CMOS) sensor or a photo diode. At this point, the calibration is performed in order to adjust the operational time of the light source and the output of the light, so that the image formed on the screen has a desired color temperature and a color coordinate.

Figure 5:
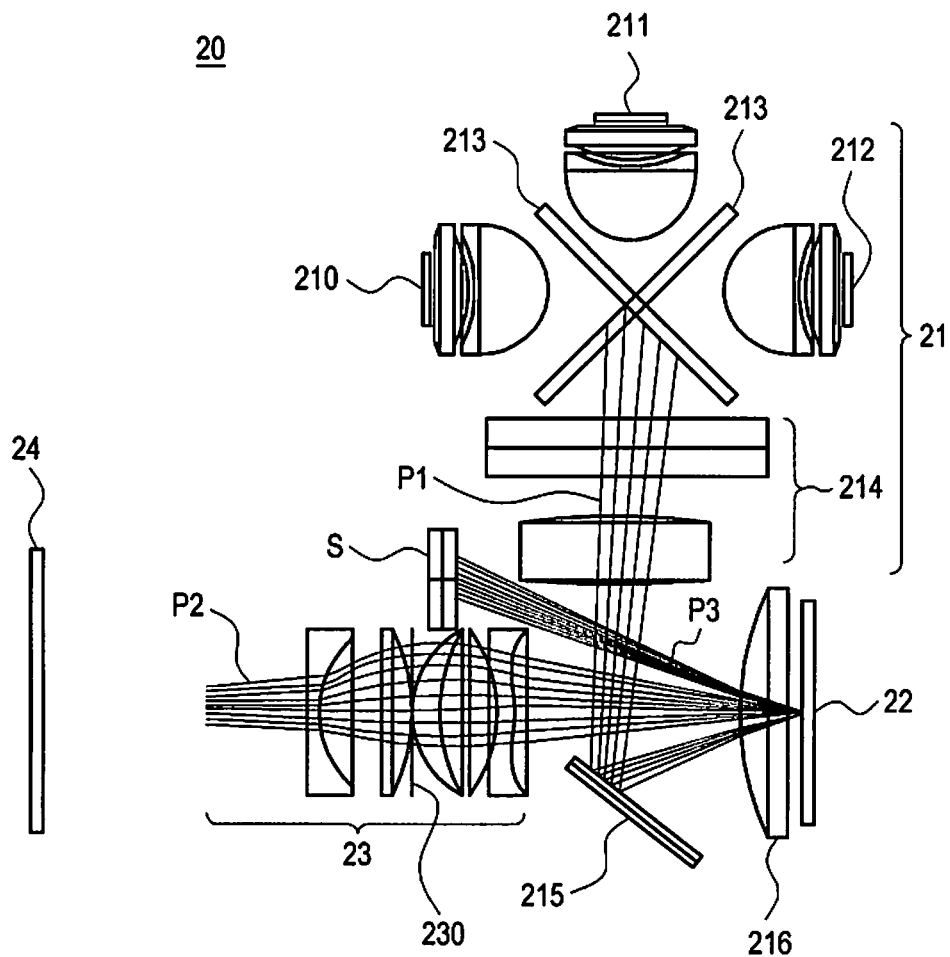
FIG. 5 is a schematic diagram illustrating an optical system of the image projector according to an embodiment of the present invention.

FIG. 5 is a schematic diagram illustrating an optical system of the image projector according to an embodiment of the present invention.

Referring to FIG. 5, an optical system 20 in an image projector in accordance with an embodiment of the present invention is described. The optical system 20 employed in the image projector of FIG. 5 includes an illuminating optical part 21, a light modulator 22, an imaging optical part 23, and a light sensing part, i.e., photo sensor S disposed in a path of light.

More specifically, the optical system 20 includes at least three independent light sources 210, 211 and 212, at least one filter 213 for a color separation of the light beam emitted from the respective light sources, a lens part 214 for providing a uniform brightness to the light beam that is color-separated by the filter 213 for the respective colors, a light modulator 22 for modulating the light beam P1 emitted from the illuminating optical part 21, an imaging optical part 23 for providing images of the light beam P1 introduced from the light modulator 22 into the light beam P2 to be projected onto the screen 24, and a photo sensor S for receiving a portion of the light beam P3 that is not being projected onto the screen 24 from among the light emitted from the illuminating optical part 21 and providing measurement values for a color calibration.

The light sources are provided in at least one package, which includes red, green, and blue-colored LED light sources or laser light sources. The light sources include a red light source 210 for generating red light, a green light source 211 for emitting green light, and a blue light source 212 for generating blue light. The green light source 211 is operated by a driving signal input from a driving part (not shown), for example, emitting green light with a wavelength of 532 nm±5 nm. The red light source 210 is operated by a driving signal transferred from the driving part (not shown), for example, generating red light with a wavelength of 640 nm±10 nm. Likewise, the blue light source 212 is operated by a driving signal input from the driving part (not shown), for example, emitting blue light with a wavelength of 440 nm±10 nm.

Meanwhile, the filter 213 is a dichroic filter to be used for a color separation of at least three RGB light sources. The filter 123 partially transmits the light beam introduced from the light sources 210, 211 and 212 i.e., the filter 213 serves to transmit only a selected wavelength from a visible spectrum, while reflecting the remaining wavelengths. The light beam transmitted through the filter 213 receives an optical reaction having a uniform brightness with respect to each color on the plane of the light modulator from the lens part 214. Then, the light beam enters the light modulator 22 via the mirror 215. The lens part 214 may include a fly-eye lens.

After being reflected by the mirror 215, the light beam P1 is focused by a field lens part 216, in order to be introduced into the light modulator 22. The field lens part 216 is provided in the light path between the light modulator 22 and the illuminating optical part 21. More specifically, the field lens part 216 is provided between the mirror 215 and the light modulator 22, in order to focus the light beam that has traveled through the mirror 215, and emits the light beam to the light modulator 22.

The light modulator 22 modulates the light beam introduced from the illuminating optical part 21 according to the image signal. The operational principle of the light modulator 22 is illustrated in FIG. 4. The light modulator 22 may a DMD. A portion of the light beams P2 modulated and reflected by the light modulator 22 is provided to the imaging optical part 23 in order to produce images to be projected onto the screen 24, while the remaining light beam P3 is directed toward the photo sensor S to be used for a color temperature calibration. The photo sensor S is disposed in the path of the light beam reflected by the light modulator 22 to receive the light beam. The light beam P3, in general, has a contrast that is an inverse of contrast the light beam P2. The photo sensor S provides measurement values necessary for calculating the color temperature or the color coordinate or calibrating the color temperature or the color coordinate, which makes it possible to make the image of the light beam to be projected onto the screen 24 by a control part (not shown) consistent therewith in a considerable level.

Accordingly, according to an embodiment of the present invention, the image signal at the calibration operation is manipulated such that the light beam P2 can show a low contrast with respect to a black image for the respective colors, while the light beam P3 can show a high contrast with respect to a white image for the respective colors. The calibration is performed using the measurement values of the color temperature and the color coordinate measured by the photo sensor S, wherein the operational time of the respective light sources 210, 211 and 212 and the light output are so adjusted to generate the desired color temperature and the color coordinate.

The imaging optical part 23 is includes of an imaging lens group that, in turn, includes a plurality of lenses and emits the received light beam onto the proper screen 24. Reference numeral 230 refers to a stop, which can be an aperture to pass through only the signal light only while blocking scattered light.

Figure 6:
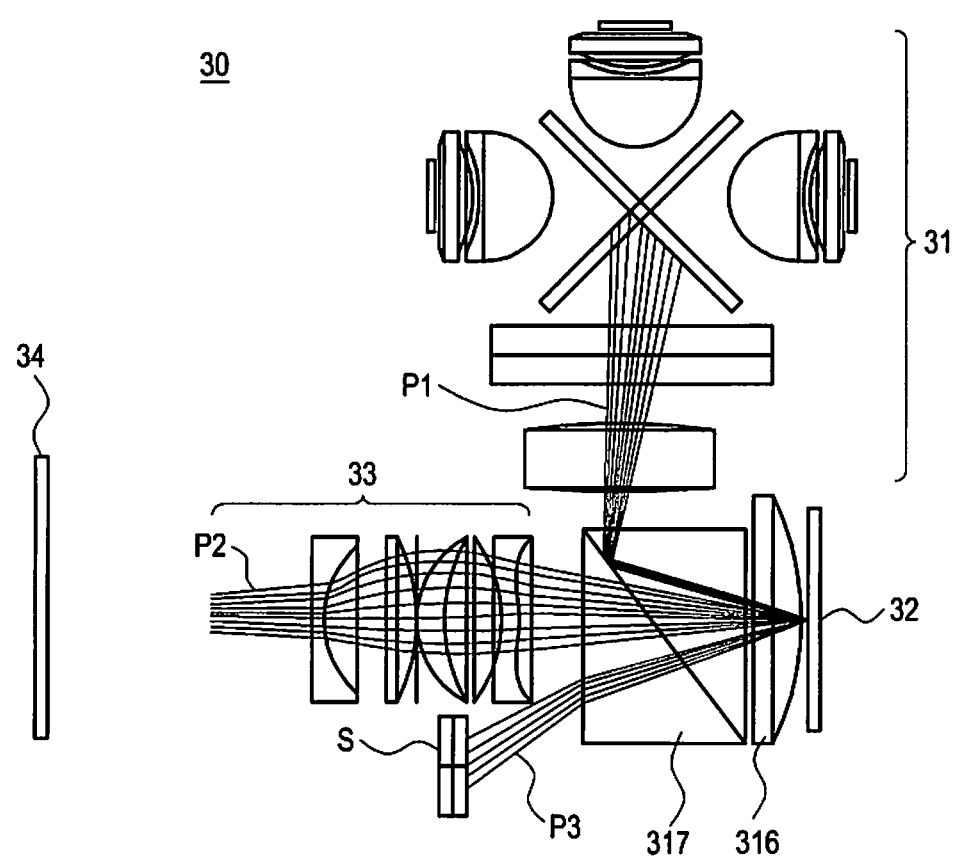
FIG. 6 is a schematic view illustrating the optical system of the image projector according to another embodiment of the present invention.

FIG. 6 illustrates a construction of an optical system 30 of an image projector in according to another embodiment of the present invention. The construction of the optical system 30 illustrated in FIG. 6 is similar to the construction of the optical system 20 of FIG. 5, and therefore, detailed descriptions corresponding to similar components will be omitted for clarity and conciseness.

As shown in FIG. 6, the optical system 30 includes an illuminating optical part 31, a light modulator 32, an imaging optical part 33 and a photo sensor S. The construction of the illuminating optical part 31 is similar to the construction of the illuminating optical part 21, and therefore a description thereof is omitted. The light beam P1 emitted from the illuminating optical part 31 is introduced into the light modulator 32 through a prism 317. The prism 317 is disposed in the light path between the imaging optical part 33 and the light modulator 32. The prism 317 is a Total Internal Reflection (TIR) prism used to convert the direction of the light beam, which is provided with a reflecting surface to reflect the received light beam P1 toward the light modulator 32 and transmit the light beam P2 reflected by the light modulator 32 to form images on a screen 34. At this moment, a portion of the light beam being reflected by the prism 317, from among the light emitted from the illuminating optical part 31, is reflected by the light modulator 32 to travel toward the imaging optical part 33. Meanwhile, the remaining light beam P3 reflected by the prism 317 is then reflected by the light modulator 32 and directed toward the photo sensor S to be used for a color temperature calibration.

A field lens part 316 is installed in the light path between the prism 317 and the light modulator 32. The field lens part 316 focuses the light beam reflected by the prism 317 toward the light modulator 32.

The photo sensor S is disposed in the path of the light reflected by the light modulator 32, receiving a portion of the light beam reflected by the light modulator 32. A portion of the light beam P2 modulated and reflected by the light modulator 32 is provided to the imaging optical part 33 for generating images to be projected onto the screen 24, while the remaining light beam P3 is directed toward the photo sensor S to be used for a color temperature calibration. The light beam P3, in general, has a contrast that is an inverse of the contrast of the light beam P2. Such a photo sensor S provides a control part (not shown) with measurement values necessary for calculating the color temperature or the color coordinate, or calibrating the color temperature or the color coordinate, which makes it possible to make the image of the light beam to be projected onto the screen 24 by the control part consistent therewith in a considerable level.

As described above, in accordance with embodiments of the present invention, an image projector may use the color calibration photo sensor provided therein without any external device, which makes it possible to easily calibrate the color of the image to be projected onto the screen and to recalibrate the color of the image according to a user's needs.

While the invention has been shown and described with reference to certain embodiments thereof, it will be understood by those skilled in the art that various changes in form and details may be made therein without departing from the spirit and scope of the invention as defined by the appended claims.

What is claimed is:

1. An image projector comprising:
    an illuminating optical part having at least three independent light sources;
    a light modulator for modulating light emitted from the illuminating optical part according to an image signal;
    an imaging optical part for projecting the light modulated by the light modulator onto the screen to form an image; and
    a photo sensor disposed in a light path traveling in a different direction than a direction of the light beam to be projected on the screen, receiving a portion of the light beam modulated by the light modulator and providing measurement values necessary for a color calibration.

2. The image projector as recited in claim 1, wherein the light sources are provided in at least one package.

3. The image projector as recited in claim 1, wherein the light modulator includes a Digital Micromirror Display (DMD).

4. The image projector as recited in claim 1, wherein the photo sensor is at least one of a color sensor, a Charge Coupled Device (CCD) sensor, a Complementary Metal Oxide Semiconductor (CMOS) sensor, and a photo diode.

5. The image projector as recited in claim 1, further comprising a field lens part in light path between the light modulator and the imaging optical part, wherein the light emitted from the illuminating optical part is reflected by a mirror and focused toward the light modulator.

6. The image projector as recited in claim 1, further comprising a Total Internal Reflection (TIR) prism in the path of the light between the light modulator and the imaging optical part, wherein a portion of light transmitted through the prism from among the light emitted from the illuminating optical part, is reflected by the light modulator to travel toward the imaging optical part, while remaining light beam transmitted through the prism is directed toward the photo sensor to be used for the color calibration.

7. The image projector as recited in claim 6, further comprising a field lens part between the prism and the light modulator, wherein the light beam reflected by the prism is focused toward the light modulator.

8. The image projector as recited in claim 1, wherein the light sources are include Light Emitting Diodes (LEDs), each LED for emitting red, green and, blue-colored light.

9. The image projector as recited in claim 1, wherein the light sources include laser light sources, each laser light source having for emitting red, green and blue-colored light.

* * * * *